Patented June 2, 1953

2,640,801

UNITED STATES PATENT OFFICE 2,640,801

AUREOMYCIN OINTMENT

Robert Lincoln Burkhart, Pearl River, N. Y., and John J. Vance, Park Ridge, N. J., assignors to American Cyanamid Company, New York, N. Y., a corporation of Maine No Drawing. Application April 8, 1950,
Serial No. 154,875

1 Claim. (Cl. 167—53.2)

This invention relates to and has as an object the provision of a preparation containing a therapeutically effective form of aureomycin in an ointment suitable for topical administration, and particularly for administration to cows for mastitis. Animal mastitis, particularly in cows, is a chronic infectious disease of the mammary glands caused by various organisms such as Streptococcus agalactiae, Staphylococcus aureus, Streptococcus uberis, Streptococcus dysgalactiae, Corynebacterium pyogenes, Escherichia coli, and other organisms. In the past, it has been responsible for the loss of many animals from production, and has decreased the milk yields of dairy cattle. Various types of sulfa preparations, silver salts and penicillin preparations have been used, with many disadvantages for each.

We have found that the new antibiotic known as aureomycin prepared, as for example, in accordance with Duggar Patent 2,482,055, is particularly effective in the treatment of this condition. We have found that by administering the aureomycin in an ointment prepared in accordance with this invention, most cows can be cured by a single treatment. We have found that by administering the ointment to each infected quarter of the udder, it is possible to obtain an extremely high rate of success in a single treatment in all but the most intractable cases. Multiple doses cure even these.

Aureomycin has been found to be a naphthacene derivative and while having a structure which strongly suggests tautomeric forms, is believed to exist with the following probable structure:

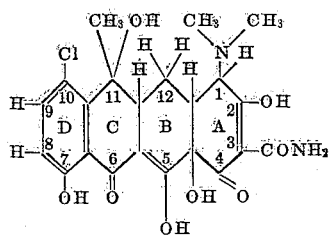

A numbering system is shown for the molecule. One proper name for the compound is 1-dimethylamino - 4,6 - dioxo - 10 - chloro - 11-methyl - 2,4a,5,7,11 - pentahydroxy - 1,4,4a,6,11,11a,12,12a - octahydronaphthacene - 3 - carboxamide. A generic term for the compound is chlorotetracycline which is consistent with the name oxytetracycline for terramycin as suggested in the Journal of the American Chemical Society, 74: 4976 (1952).

We find that it is necessary for a high degree of success that therapeutically effective concentrations of the aureomycin be present in the udder for from 24 to 72 hours. With aureomycin in an aqueous suspension, it is found that several treatments are necessary to secure satisfactory cures. However, by preparing an ointment containing the aureomycin in a micropulverized state in a base consisting of liquid petrolatum, petrolatum jelly and anhydrous lanolin, there is obtained a product which when injected into the udder rises because of its light specific gravity so as to treat all affected portions, and additionally releases the aureomycin at such a rate that effective concentrations are maintained for the required length of time. The aureomycin may be present as the hydrochloride, free aureomycin, or as a salt with a metal. The aureomycin is most readily obtainable commerically as the hydrochloride, and accordingly is most conveniently used in this form. Other forms, of course, may be used when procurable.

Aureomycin becomes inactivated if permitted to remain in contact with water over prolonged periods. The anhydrous preparation prepared in accordance with this invention permits the aureomycin to remain stable and active for prolonged periods so that the ointment may be prepared for administration and still remain therapeutically effective for at least two or three years, under normal storage conditions. This remarkably long shelf life permits the preparation of products for distribution through normal channels without the necessity of refrigeration, or encountering large quantities of returned goods. We have found that when prepared in accordance with this invention, there is obtained an ointment which has such consistency that it may be readily and conveniently administered under any normal temperature conditions present with dairy herds.

For purposes of convenience of administration for mastitis, it is desirable that the ointment have such a consistency that under normal temperatures, it is a fairly fluid ointment so that it may be readily inserted into the teat canal and is readily mobile so that it distributes itself through the entire infected area whereby all portions of the mammary gland are subject to the action of the aureomycin. The particular vehicle used by us gives a prolonged period of action apparently by slowly releasing the aureomycin from the vehicle so that therapeutically effective aureomycin levels are maintained for at least 48 hours in spite of its dilution by and secretion with the milk from the gland. Additionally, the ointment is useful for topical administration to both animals and humans where a surface infection caused by an aureomycin-sensitive organism occurs. For such topical administration, it is frequently desirable that the ointment be somewhat more viscous than is desirable for use in mastitis. The viscosity, of course, is a matter of obvious choice and may be readily modified over a wide range for particular purposes or particular temperature conditions which render it desirable.

We have found that the aureomycin, as for example the hydrochloride, may be present in a preferred concentration of from 0.5% to 15% and may be dispersed in an anhydrous vehicle containing from 5 to 50% lanolin, and the remainder a mixture of liquid petrolatum and petrolatum jelly, either white or yellow, in such proportions as to cause the viscosity to be as desired. Because the viscosity of these materials may vary, the relative proportions to get a desired viscosity may vary, and is a matter of choice for each application. White petrolatum is usually preferred because it is more highly purified and results in a lighter, clearer product. It is desirable that the aureomycin be finely divided so that a smooth ointment is obtained with no gritty particles. A very satisfactory ointment has been prepared from an aureomycin hydrochloride in which the largest particle has as a maximum dimension 100 microns and approximately 35% is within the range of from 5 to 10 microns, approximately 60% within the range of 3 to 5 microns and approximately 5% less than 3 microns. It is desirable that the aureomycin as the hydrochloride or in other forms be finely powdered before its mixture because it is usually more convenient to grind the solid while dry than while dispersed, although, of course, the aureomycin may be ground to size while dispersed in part of the petrolatum by use of a colloid mill, a ball mill, or other grinding means well known to the arts.

As specific examples, by way of illustration but not limitation, are the following:

Example 1

30 grams of aureomycin hydrochloride were micropulverized so that the particle size count showed the largest particle to be less than 100 microns, approximately 35% to be within the range of 5 to 10 microns, approximately 60% to be within the range of 3 to 5 microns, approximately 5% to be less than 3 microns. To the aureomycin thus ground were added 250 grams of liquid petrolatum (mineral oil) and the mixture ground smooth in a colloid mill. A second mixture was prepared of 620 grams of white petrolatum and 100 grams of anhydrous lanolin U. S. P. by mixing them with thorough stirring at 50 to 52° C. To this mixture was then added the aureomycin in the liquid petrolatum and the mixture stirred while cooling to a temperature of approximately 31° C. A smooth comparatively fluid stable dispersion of aureomycin was thereby prepared. The product was filled into ¼ ounce tubes with long nozzles suitable for injection into the teat canal. The product remains stable over long periods and does not separate under normal storage temperature conditions.

Example 2

A topical ointment was prepared by mixing 30 grams of aureomycin micropulverized to the particle size range as in Example 1 with 150 grams of liquid petrolatum. A second mixture was prepared of 720 grams of white petrolatum and 100 grams of anhydrous lanolin U. S. P. The white petrolatum and anhydrous lanolin were mixed together at a temperature of approximately 50° C. until a smooth uniform mixture was obtained and thereto added the smoothly ground suspension of the aureomycin hydrochloride in the liquid petrolatum, the combined mixture stirred until smooth and permitted to cool to room temperature. A more viscous product was obtained which was filled into tubes for topical administration.

Example 3

Five grams of micropulverized aureomycin hydrochloride were mixed with 20 grams of melted yellow petrolatum U. S. P., and ground smooth in a colloid mill. A second mixture was prepared of 25 grams of white petrolatum and 50 grams of lanolin, anhydrous, which was ground smooth at 60° C. After smooth uniform mixtures were obtained, the two mixtures were mixed together and stirred while cooling, until the mixture had sufficiently set up so that the aureomycin did not tend to separate. There was obtained a product of medium viscosity, suitable for injection into a cow's udder. The mixture was very satisfactory for use as a mastitis ointment, but was a little thinner than usually desired for topical use.

Example 4

A topical ointment was prepared by adding 1 gram of aureomycin hydrochloride to 500 grams of melted white petrolatum. The mixture was ground until the aureomycin was smoothly dispersed throughout the white petrolatum. A mixture was prepared of 50 grams of lanolin, 200 grams of liquid petrolatum and 249 grams of white petrolatum, which were mixed together at a temperature of approximately 50° C. until a smooth uniform mixture was obtained. The mixture of the aureomycin in its petrolatum base was added thereto and the two mixtures stirred together until a smooth uniform mixture was obtained and the stirring continued while cooling until the mixture had set up sufficiently that the aureomycin did not tend to settle. A fairly viscous product was obtained which is suitable for use as an eye ointment or for application to the surface of the skin. The low aureomycin content renders the ointment particularly satisfactory for use near the eye or on hairy areas where large quantities of ointment are required in order that it may be worked into the underlying skin.

Example 5

A mixture was prepared of 100 grams of lanolin, 720 grams of white petrolatum and 150 grams of liquid petrolatum by stirring at approximately 50° C. until a smooth uniform mixture was obtained. Thereto was added 30 grams of aureomycin as the free base in a micropulverized state, and the mixture run through a colloid mill to completely disperse the aureomycin in the vehicle. The mixture was stirred while cooling until it had set sufficiently so that the aureomycin did not tend to settle, and then filled into jars. A fairly viscous product was obtained suitable for application to the skin of humans or animals.

Example 6

The above experiment was repeated using the ethylenediamine salt of aureomycin. The ointment obtained was of substantially the same consistency and utility.

It will be understood, of course, that the quantity of aureomycin may vary over wide limits as above mentioned, as may the lanolin concentration. The exact viscosity is a matter of choice within the compounder's art, but the above examples give products which are thoroughly satisfactory and give a quantity that is therapeutically effective within a concentration range which is convenient for administration.

As typical of the results which may be expected, a particular cow, No. 583, had administered thereto 30 milligrams of an ointment prepared in accordance with Example 1, and in the milk there was found to be after:

| | Micrograms per milliliter |
|---|---|
| 12 hours | 100 |
| 24 hours | 10 |
| 36 hours | 5 |
| 48 hours | 2 |

In contradistinction thereto, the milk levels of aureomycin were measured after the administration of 100 milligrams of aureomycin in 50 cc. of physiological saline. The following levels were obtained:

| | Micrograms per milliliter |
|---|---|
| 1 hour | 800 |
| 2 hours | 200 |
| 4 hours | 80 |
| 8 hours | 8 |
| 12 hours | 2 |
| 24 hours | 0.2 |
| 36 hours | 0.05 |
| 48 hours | Not measurable |

We claim:

A long nozzle tube containing an ointment, adapted to be injected into a teat canal for the treatment of bovine mastitis, said ointment comprising essentially 0.5 to 15% of aureomycin hydrochloride, 5 to 50% lanolin and the remainder a mixture of petrolatum jelly and liquid petrolatum in such a ratio that said ointment is storage stable, maintains the aureomycin hydrochloride in suspension over a prolonged period, and softens sufficiently to float in the milk in an udder, and release the aureomycin hydrochloride at udder temperature.

ROBERT LINCOLN BURKHART.
JOHN J. VANCE.

References Cited in the file of this patent

UNITED STATES PATENTS

| Number | Name | Date |
|---|---|---|
| 2,482,055 | Duggar | Sept. 13, 1949 |
| 2,498,374 | Martin | Feb. 21, 1950 |

OTHER REFERENCES

Pharmaceutical Recipe Book, 1943, 3rd edition, American Pharmaceutical Association, page 133.

Hollander et al.: American Pract. and Digest of Treatment, volume 1, page 54, January 1950.

J. A. P. A., Practical Pharmacy Edition, 1945, page 127.

Montinho: Gazeta Medica Portuguesa, volume II, Number 2, September 1949, pages 497 to 498.